No. 862,898. PATENTED AUG. 13, 1907.
W. D. FORSYTH.
FASTENING DEVICE.
APPLICATION FILED MAY 11, 1907.
2 SHEETS—SHEET 1.
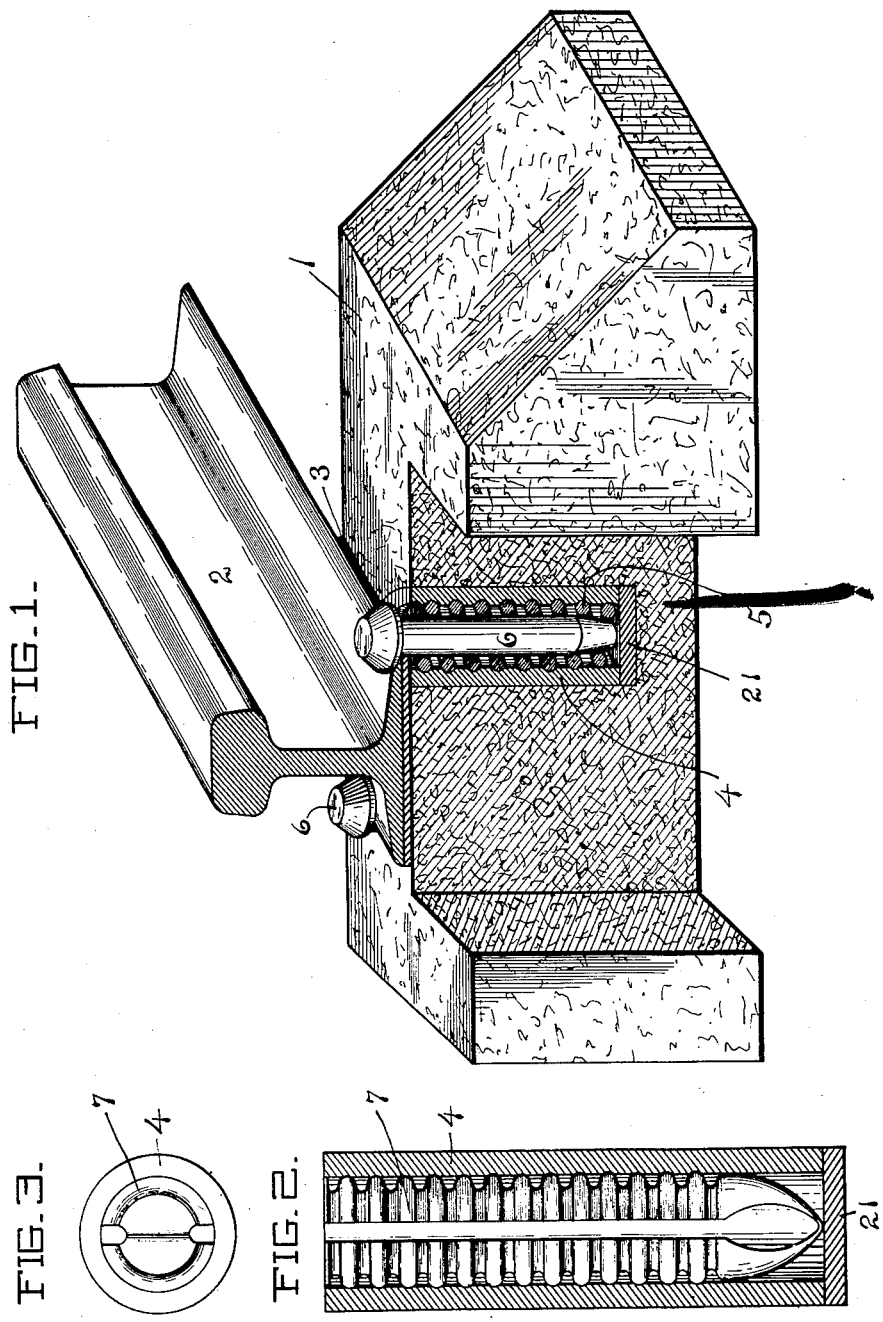
Witnesses:
W. Bruce Hudson
Elizabeth M. Brown
Inventor
W. D. Forsyth.
By his Attorney
Edward N. Pagelsen.

No. 862,898. PATENTED AUG. 13, 1907.
W. D. FORSYTH.
FASTENING DEVICE.
APPLICATION FILED MAY 11, 1907.
2 SHEETS—SHEET 2.
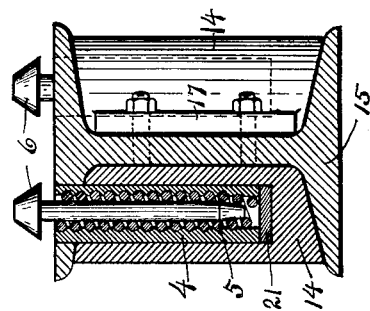
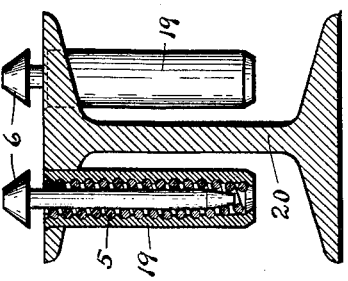
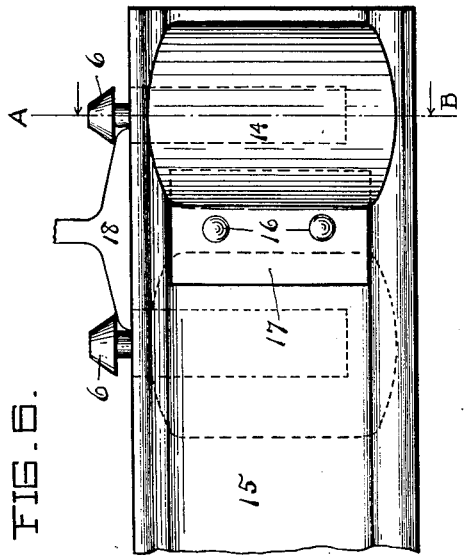
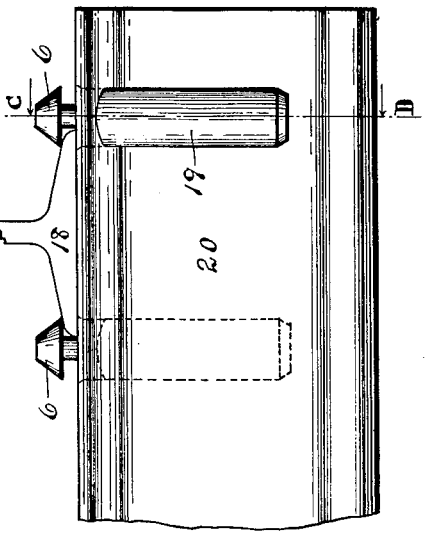
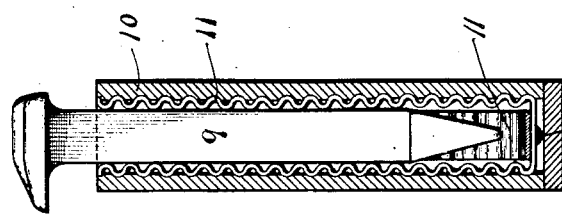
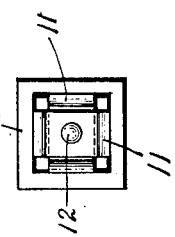
Witnesses:
W. Bruce Hudson.
Elizabeth M. Brown.
Inventor
W. D. Forsyth.
By his Attorney
Edward N. Pagelsen.

UNITED STATES PATENT OFFICE.

WILLIAM D. FORSYTH, OF PITTSBURG, PENNSYLVANIA, ASSIGNOR TO TRUSSED CONCRETE STEEL COMPANY, OF DETROIT, MICHIGAN, A CORPORATION OF MICHIGAN.

FASTENING DEVICE.

No. 862,898.  Specification of Letters Patent.  Patented Aug. 13, 1907.

Application filed May 11, 1907. Serial No. 373,137.

*To all whom it may concern:*

Be it known that I, WILLIAM D. FORSYTH, a citizen of the United States, residing at Pittsburg, in the county of Allegheny and State of Pennsylvania, have invented a new and useful Fastening Device, of which the following is a specification.

My invention relates to means for securing bolts, pins and spikes firmly in operative position, and the object of my improvements is to provide safe, reliable and comparatively inexpensive means whereby rails may be secured to cross-ties, steel beams may be secured together and other objects fastened together under conditions that do not permit the use of threaded bolts or other well known assembling devices.
My invention consists of a sleeve of stiff, hard material, a resilient engaging device mounted therein, and a bolt, pin or spike adapted to be driven into the engaging device.

It consists further in forming the sleeve of proper material so that the bolt, pin or spike may be insulated from the body surrounding the sleeve.

In the accompanying drawings which illustrate my invention, Figure 1 shows a portion of rail road tie with a section of rail secured thereto by my improved fastening device. Fig. 2 is a longitudinal cross section and Fig. 3 an end view showing another form of fastening device. Fig. 4 is a longitudinal cross section showing a third form of the device. Fig. 5 is an end view of the sleeve and spring. Fig. 6 is a view of the form shown in Fig. 1 adapted for fastening two steel beams together. Fig. 7 is a cross section on the line A—B of Fig. 6. Fig. 8 is a view of another form of fastening device for the same purpose. Fig. 9 is a cross section on the line C—D of Fig. 8.
Similar reference characters refer to like parts throughout the several views.

In the following description, the term spike will be employed to designate any form of bolt, pin or spike that can be driven into a socket, whatever may be its cross section or the shape of its head.

In Fig. 1 of the accompanying drawings, 1 is the end of a concrete cross tie and 2 a rail. A sheet 3 of any resilient material may be placed between the rail and tie, and if the rail is to be used on a track using a block signal system, this plate may be of insulating material. Tubes or sleeves 4 of moderately hard, resilient material, indurated fiber or hard wood preferred, are either molded in the tie or are driven into holes formed therein. A spring 5 is placed in each sleeve, the normal outside diameter of the spring being that of the bore of the sleeve. A pointed spike 6 whose diameter is somewhat greater than the inner diameter of the spring is driven into the same to hold the rail in position.
When the spike is driven down, the spring opens and its coils are forced into the material of the sleeve. The grip of the spring on the spike is sufficient to insure its being held in position. The spike will be held as firmly by this fastening device as it would be if driven into a good oak tie.

Where the rails are held down against cross ties by means of bolts, the ignorant track hand often strains the bolt through turning down the nut too hard. Any unusual stress on the bolt, such as is often set up by the swaying of a heavy locomotive under high speed, causes the bolt to break. By using my improved fastening device this source of danger is obviated as the spikes are driven down until the head bears on the rail flange, and any additional blows result in the head being battered slightly and nothing more. Coal tar may be poured into the sleeve around the bolt and spring if desired.

Instead of a coil spring 5, a flat strip of sheet spring steel may be formed in the manner shown in Figs. 2 and 3, the resulting spring 7 having the same fastening characteristics as the spring 5.

The usual rail spike 9 now in use is shown in Fig. 4 and is square in cross section. The sleeve 10 will also be rectangular, and the fastener may be formed from two strips 11 of corrugated metal, bent so as to fit the sleeve and crossing each other at the bottom. The two strips may be secured together by a rivet 12, if desired. The ridges of the corrugations of the springs are transverse to the faces of the spike, and the grip on the same is so great, that when the parts are properly proportioned, it is almost impossible to withdraw the spike. If desired, the number of these corrugated springs may be varied.

Where the shape of the body of the supporting member renders the forming of a socket for the sleeve impossible, as in the I beams shown in Figs. 6 to 9 inclusive, I may secure cheeks 14 to the I beam 15 by means of the bolts 16 passing through the flanges 17 of the cheeks. The sleeves 4, springs 5, and spikes 6 will be the same as before described, and structural member 18 will be securely held in position. Instead of this construction I may secure sleeves 19 in the flanges of the beam 20, the sleeves being of metal tubing. The springs 5 and spikes 6 will retain the beam 18 in position.

In Fig. 1 I have shown means for securing a rail to a concrete cross-tie. It will be evident that the same means may be employed to secure any object or machine to a concrete structure which has usually been bolted thereto. The disks 21 and 22 at the ends of the sleeves may be omitted if desired.

Having now explained my improvements, what I claim as my invention and desire to secure by Letters Patent is,—

1. A fastening device, comprising a sleeve adapted to fit an aperture in a support, a spring in said sleeve, and retaining means adapted to be driven into said sleeve in engagement with the spring.

2. A fastening device, comprising a sleeve of resilient material adapted to fit an aperture in a support, a spring in said sleeve, and retaining means adapted to be driven into said sleeve in engagement with the spring.

3. A fastening device, comprising a sleeve of resilient fibrous material, a spring fitting therein, and a spike adapted to be driven into the spring.

4. A fastening device comprising a sleeve which is a non-conductor of electricity, a coiled spring fitting therein, and retaining means adapted to be driven into said sleeve into engagement with said spring.

5. A fastening device comprising a supporting body having an aperture, a spring in said aperture, and a fastening device adapted to be driven into the spring.

In testimony whereof I have signed my name in the presence of two subscribing witnesses.

WILLIAM D. FORSYTH.

Witnesses:
J. J. HAMILTON,
W. BENNETT McELWAY.